United States Patent [19]

White

[11] Patent Number: 5,040,859
[45] Date of Patent: Aug. 20, 1991

[54] INFRA-RED RADIATION MODULATOR

[75] Inventor: John C. White, Cuddesdon, England

[73] Assignee: Thorn EMI plc, London, England

[21] Appl. No.: 401,404

[22] Filed: Sep. 1, 1989

[30] Foreign Application Priority Data

Sep. 3, 1988 [GB] United Kingdom ............... 8821863

[51] Int. Cl.$^5$ ............................................. G02F 1/015
[52] U.S. Cl. .................................. 359/276; 359/278; 359/248; 359/350
[58] Field of Search ............ 350/1.1, 386, 392, 96.12, 350/96.14, 354, 356, 355; 250/330, 331, 332

[56] References Cited

U.S. PATENT DOCUMENTS

| | | | |
|---|---|---|---|
| 2,955,269 | 10/1960 | Silvey | 350/1.1 |
| 3,295,911 | 1/1967 | Ashkin et al. | 350/386 |
| 3,457,468 | 7/1969 | Kawaji | 350/386 |
| 3,516,728 | 6/1970 | Fenner | 350/392 |
| 3,611,207 | 10/1971 | Klahr | 350/386 |
| 3,748,597 | 7/1973 | Reinhart | 350/386 |
| 3,919,555 | 11/1975 | Singer | 250/330 |
| 4,190,811 | 2/1980 | Alcock et al. | 372/25 |
| 4,208,667 | 6/1980 | Chang et al. | 350/354 |
| 4,350,413 | 9/1982 | Bottka et al. | 350/356 |
| 4,492,434 | 1/1985 | Bottka et al. | 350/356 |
| 4,685,988 | 8/1987 | Wagner et al. | 350/96.12 |
| 4,716,449 | 12/1987 | Miller | 350/354 |
| 4,787,691 | 11/1988 | Lorenzo et al. | 350/96.14 |
| 4,795,240 | 1/1989 | Wong et al. | 350/356 |

FOREIGN PATENT DOCUMENTS

| | | |
|---|---|---|
| 1334630 | 7/1963 | France . |
| 88/00358 | 1/1988 | PCT Int'l Appl. ............... 350/386 |
| 868275 | 5/1961 | United Kingdom . |
| 1089386 | 11/1967 | United Kingdom . |

OTHER PUBLICATIONS

"CO2 Laser Modulation Using Si p-v-n Diode," Ogawa et al., Electronics and Communications in Japan, vol. 59-C, No. 9, 1976, pp. 77-85.

"Electrooptical Effects in Silicon," Soref et al., IEEE Journal of Quantum Electronics, vol. QE-23, No. 1, Jan. 1987, pp. 123-129.

Primary Examiner—Bruce Y. Arnold
Assistant Examiner—Martin Lerner
Attorney, Agent, or Firm—Fleit, Jacobson, Cohn, Price, Holman & Stern

[57] ABSTRACT

An infra red radiation modulator comprises a p type silicon substrate 1 having spaced n type and p type doped regions 2, 3 having respective doping concentrations of approximately $10^{20}$ and $10^{16}/cm^3$. A signal source 11 provides a bias voltage between the doped regions 2,3 via electrodes 4 for modifying the concentration of free carriers in the substrate between the doped regions and therefore the response of the modulator to incident infra red radiation. By appropriate control of the bias voltage the modulator can be caused to modulate, chop, filter or spectrally scan the incident radiation.

8 Claims, 2 Drawing Sheets

INFRA-RED RADIATION MODULATOR

BACKGROUND OF THE INVENTION

This invention relates to modulators, such as filters and choppers, for use with infra-red radiation.

In certain applications of infra-red imagers, there is a need for improved discrimination of the imaged radiation. This requirement could in principle be met by the use of a number of infra-red spectral filters, each covering a respective wavelength range in the overall wavelength band, and substituting filters until acceptable performance was achieved. However, it is not practical to continuously change the spectral filter. It is possible to process each wavelength range in parallel, but this would greatly increase the cost, complexity, weight and volume of the equipment.

It is normal practice in an infra-red imager to interrupt the received infra-red radiation at regular intervals using a chopper comprising rotating blades. However, this involves the use of mechanical movement and of an electric motor, which can cause problems in generating local heat which has to be properly allowed for.

It has previously been proposed to use a compound semiconductor crystal of cadmium telluride doped with iron ions to intensity modulate infra red radiation, as described in U.S. Pat. No. 3,516,728. However, cadmium telluride has, inherently, a very small band gap and hence, hot carriers, which are not in equilibrium with the crystal lattice structure, are caused to transfer their energy to Fe ions, thereby in effect to modify the bandgap, and as a consequence of the new energy state of the Fe ions, the optical absorption of the crystal is changed. Very high voltage levels are required, in the order of 3000 volts to approach 100% relative absorption, and the crystal must be maintained in a low temperature environment. Furthermore, as the hot carriers are not in equilibrium with the lattice, filtering is localised to a relatively small region of the crystal. Additionally, although the relative slope of the band edge may be altered slightly by the application of various values of modulating current the device has a relatively fixed pass band. Hence, the band edge of the device cannot be swept so as to cause the device to wavelength scan incident infra red radiation.

It has also been proposed, in U.S. Pat. No. 4,190,811, to switch a high power signal laser beam having a predetermined infra red radiation frequency by the use of a semiconductor which is transparent to the signal laser beam. A control beam is used to irradiate the surface of the semiconductor, the radiation beam having a frequency sufficiently high to produce free carriers in the semiconductor and sufficient radiation intensity and time duration to produce a free carrier density sufficient to cause reflection of the signal beam. With such devices, however, a relatively intense control beam is required. Furthermore it is relatively difficult to control accurately the density of the free carriers generated by the use of an irradiated beam as absorption of the beam by the semiconductor material is relatively inefficient. Optical control of the free carrier concentration makes such devices unsuitable for many applications.

SUMMARY OF THE INVENTION

It is an object of the present invention to provide an improved form of modulator in which accurate control may be achieved, thus enabling spectral filtering, spectral scanning and controlled modulation of incident radiation in addition to operation as an optical shutter.

Accordingly, there is provided a modulator for infra red radiation comprising a substrate of semiconductor material having a bandgap substantially greater than the wavelength of infra red radiation, the substrate including a first doped region of first conductivity type, a further doped region of opposite conductivity type spaced from the first region, and electrode means for receiving an applied signal for modifying the concentration of free carriers in the substrate between the doped regions thereby to control the response of the modulator to infra red radiation incident thereon.

Preferably, the semiconductor material comprises silicon, the first doped region comprising n conductivity type having a doping concentration of approximately $10^{20}/cm^3$ and the further doped region comprising p conductivity type having a doping concentration in the range $10^{15}$ to $10^{16}/cm^3$.

In one embodiment the modulator further comprises signal means for providing the applied signal, the signal means being arranged to provide a forward bias voltage between the doped regions for increasing the concentration of free carriers in the substrate between the doped regions to control the reflectivity and transmissivity of the modulator to infra red radiation as a function of the wavelength of the radiation.

The level of forward bias voltage may be arranged such that the incident radiation, depending whether it is transmitted by or reflected from the modulator, is high or low pass filtered, the high or low pass cut-off wavelength being determined by the forward bias voltage level.

The forward bias voltage level may be arranged to vary or step between voltage levels such that, depending upon the voltage levels, the incident radiation may be amplitude modulated or chopped.

In a further embodiment the modulator may comprise means for measuring the wavelength of the radiation reflected from or transmitted by the substrate, the signal means being arranged to provide a pair or pairs of forward bias voltages so as to provide bandpass filtering or spectral scanning of the incident radiation.

Embodiments of the invention will now be described in greater detail, and by way of example only, with reference to the accompanying drawings of which:

DESCRIPTION OF PREFERRED EMBODIMENTS

Figure 1:
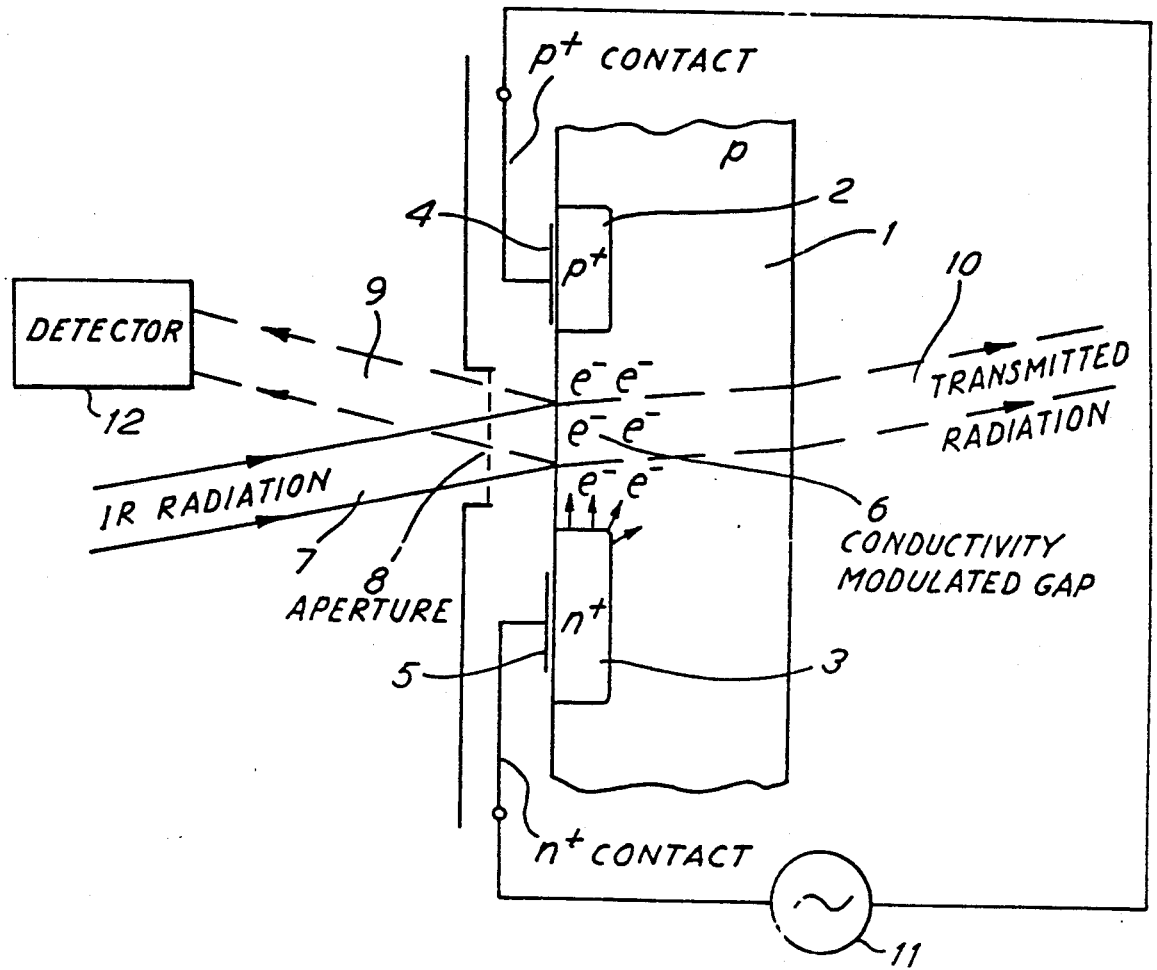
FIG. 1 shows a schematic cross-section of an infra-red modulator according to the invention.
Figure 2:
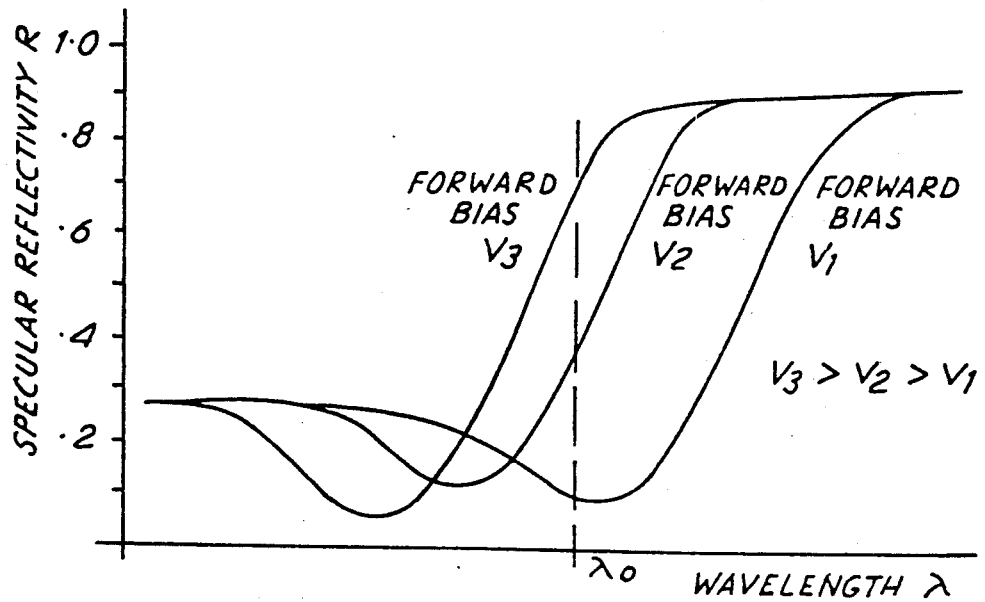
FIG. 2 shows the reflectivity of the infra-red modulator of FIG. 1 as a function of wavelength for various values of forward bias.

Referring to FIG. 1, a modulator comprises a p-doped silicon substrate 1 having heavily doped spaced apart p+ and n+ regions 2 and 3 at one surface. Each of these regions is provided with an electrode, such as metal contacts 4 and 5 so that a voltage bias can be applied across the gap 6 between the two regions from a signal source 11. As the forward voltage bias is increased free carriers, i.e. electrons, are injected into the gap from the n+ region 3. The conductivity of the gap is increased and the surface of the substrate 1 becomes more reflective and less transmissive to incident infra red radiation. A beam 7 of infra-red radiation passing through the aperture 8 is, therefore, partially reflected at the surface of the substrate 1 between the doped regions to form a reflected beam 9 and a transmitted beam 10. The distribution of energy between the two beams is dependent on the forward voltage bias applied across the gap 6 from the signal source 11, as shown in FIG. 2. It can be seen from FIG. 2 that as the forward bias is increased, e.g. from value $V_1$ to value $V_3$, the high specular reflectivity of the substrate 1 to incident radiation is extended to lower wavelengths. The band edge of the pass band of the modulator can therefore be swept across the spectrum of the incident radiation by variation of the bias voltage.

Figure 3:
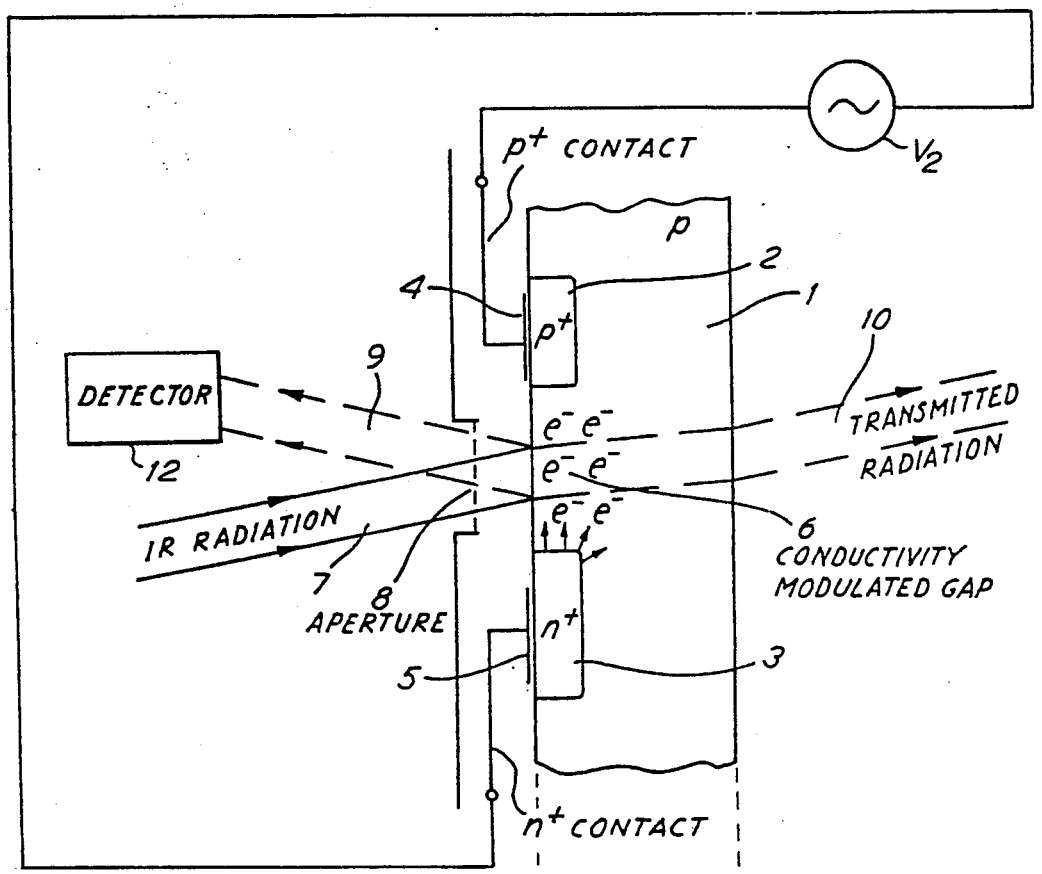
FIG. 3 shows a schematic cross-section of an alternative embodiment of infra-red modulator for use as a band pass filter.
Figure 3:
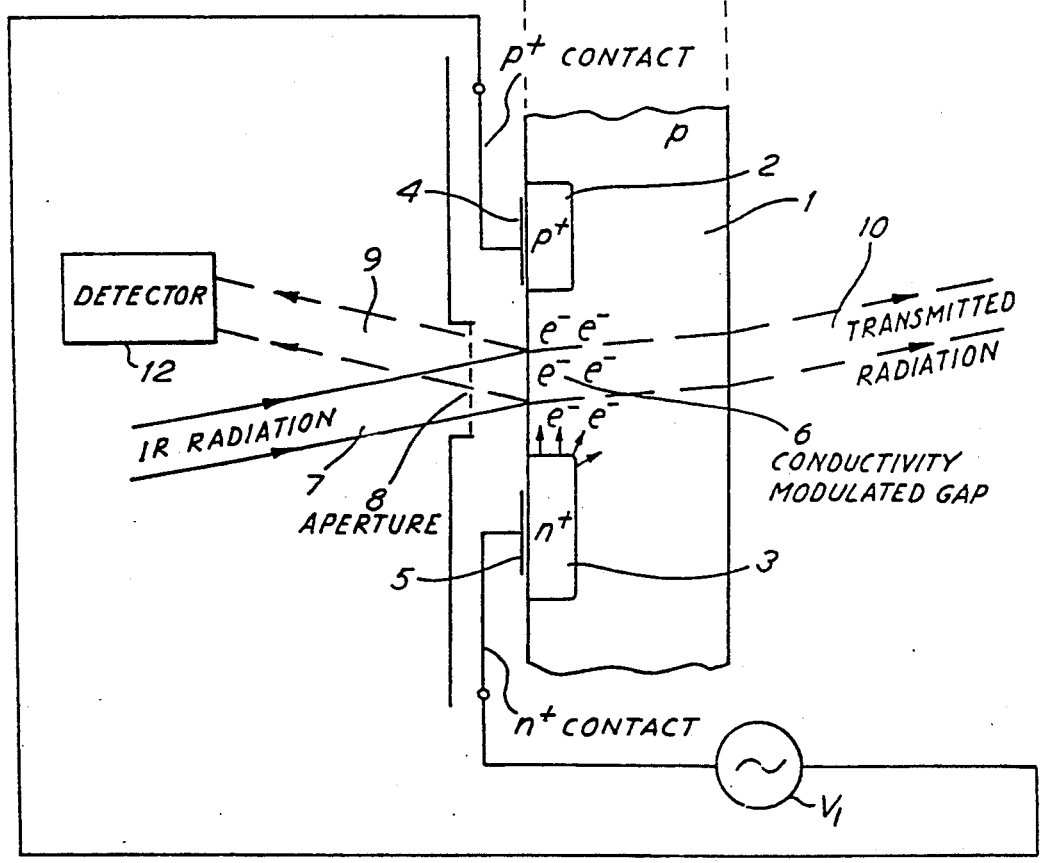

Thus the irradiating beam can be modified in several ways. For example:

1) Amplitude modulated by varying the forward bias voltage over a relatively small range (for example between voltages $V_2$ and $V_3$ in FIG. 2) so that the reflectivity at the radiation wavelength (for example $\lambda_0$ in FIG. 2) varies rapidly with change of bias.
2) Radiation chopped, or pulse modulated, by varying the bias voltage over a relatively wide range (for example between voltages $V_1$ and $V_3$ in FIG. 2) so that the reflectivity of the substrate 1 is alternately high and low.
3) Filtered to remove low wavelengths by applying a forward bias of a predetermined voltage level, the cut-off wavelength being determined by the applied bias.
4) Filtered to accept only a selected range of wavelengths by subtracting the response of the substrate 1 at one bias voltage (for example $V_2$ in FIG. 2) from the response with an increased bias voltage (for example $V_3$ in FIG. 2). By the use of pairs of bias voltages the selected range of wavelengths can be scanned across the available wavelength spectrum, to provide a spectrum analysis of the irradiating beam 7. Either successive measurements may be made, such as by detection means 12 for measuring the wavelength of the reflected radiation, at different bias voltages and pairs of measurements subtracted from each other or two modulators may be irradiated simultaneously, as shown in FIG. 3, the first modulator having a smaller bias than the second device, the measurement from the first device subtracted from the measurement from the second device.

It is also possible to use the transmitted beam 10 in a complementary manner. For example, the simple filter with fixed bias voltage (item 3 above) would remove the high wavelengths instead of the low wavelengths so as to provide low pass filtering of the irradiating beam 7. However, use of the transmitted beam is less efficient than use of the reflected beam because at the lower wavelengths there are lattice absorption peaks due to the longitudinal resonance of the Si—O bond in the substrate 1. In this particular respect, germanium may be a preferred substrate material.

A passband filter (item 4 above) can also be realised by using a reflected beam from a first modulator with one bias voltage (for example $V_1$ in FIG. 2) and a transmitted beam from a second modulator with a smaller bias voltage (for example $V_2$ in FIG. 2). Only radiation within the selected wavelength band would be both reflected and transmitted through the two devices.

Although the present invention has been described with reference to specific embodiments, it should be realised that modifications may be effected whilst remaining within the scope of the invention.

I claim:

1. A modulator for infrared radiation comprising a silicon substrate, the substrate including a first doped region of n conductivity type having a doping concentration of approximately $10^{20}/cm^3$ and a further doped region of p conductivity type and having a doping concentration in the range $10^{15}$ to $10^{16}/cm^3$, the further doped region being spaced from the first region thereby to provide a gap region in the substrate arranged between the first and further doped regions, and electrode means for receiving an applied signal and applying a voltage bias between the first and further doped regions for modifying the concentration of free carriers in the gap region of the substrate thereby to enable the transmissivity and reflectivity of the modulator to infrared radiation incident on the gap region to be controlled by the applied signal received by the electrode means.

2. A modulator according to claim 1 further comprising signal means for providing the applied signal, the signal means being arranged to provide an applied signal for generating a forward voltage bias level between the doped regions for increasing the concentration of free carriers in the gap region of the substrate thereby to provide a modulator having an incident radiation frequency passband characteristic with a lower cut off frequency determined by the forward voltage bias level for enabling infra red radiation incident on the gap region to be high or low pass filtered by the modulator in dependence upon the forward voltage bias level provided by the applied signal.

3. A modulator according to claim 2, wherein the signal means is arranged to provide a forward voltage bias of a first voltage level between the doped regions for providing a first level of concentration of free carriers in the gap region, and a forward voltage bias of a second voltage level between the doped regions for providing a second level of concentration of free carriers in the gap region, the transmissivity of the modulator to incident radiation at one of the levels of concentration of free carriers in the gap region being less than the transmissivity at the other of the levels of concentration of free carriers in the gap region for enabling infra red radiation incident on the gap region to be amplitude modulated by varying the forward voltage bias between the first and second voltage levels.

4. A modulator according to claim 2 wherein the signal means is arranged to provide a forward voltage bias of a first voltage level for providing a first level of concentration of free carriers in the gap region, and a forward voltage bias of a second voltage level for providing a second level of concentration of free carriers in the gap region, the modulator being substantially transmissive of incident radiation at one of the levels of concentration of free carriers in the gap region and substantially reflective of incident radiation at the other of the levels of concentration of free carriers in the gap region, for enabling infra red radiation incident on the gap region to be chopped or phase modulated by stepping the forward voltage bias between the first and second voltage levels.

5. A modulator according to claim 2 further comprising measuring means for measuring the wavelength of infra red radiation reflected from and or transmitted by the substrate, wherein the signal means is arranged to provide a pair of forward voltage bias levels of unequal voltage level between the doped regions for providing a pair of respective concentrations of free carriers in the gap region of the substrate, thereby to cause the modulator to exhibit a respective pair of frequency passband characteristics with respective lower cut off frequencies determined by the pair of forward voltage bias levels, and wherein the measuring means is arranged to measure the wavelengths of any infra red radiation impinging on the modulator and reflected from or transmitted by the gap region at each of the pair of forward voltage bias levels, the measuring means being further arranged to subtractively combine the wavelengths measured at one forward voltage bias level from the wavelengths measured at the other of the pair of forward voltage bias levels so as to determine whether the infra red radiation impinging on the modulator comprises radiation of any wavelength between the respective lower cut off frequencies determined by the pair of forward voltage bias levels.

6. A modulator according to claim 5 wherein the signal means is arranged to provide, in sequence, a plurality of the pairs of forward voltage bias levels of unequal level, the plurality of pairs of forward voltage bias levels being arranged to cause the respective lower cut off frequencies to scan the infra red wavelength spectrum, and wherein the measuring means is arranged to measure and subtractively combine the measured wavelengths at each of the pairs of forward voltage bias levels, thereby to provide a spectrum analysis of any infra red radiation impinging on the modulator.

7. A modulator according to claim 2 comprising additional first and further spaced doped regions, thereby to provide an additional gap region, wherein the signal means is arranged to provide contemporaneously a pair of forward voltage bias levels comprising a first forward voltage bias level between the first and further doped regions for increasing the concentration of free carriers in the gap region to a first concentration level thereby to provide the gap region with a frequency passband characteristic having a first lower cut off frequency determined by the first forward voltage bias level, and to provide a second forward voltage bias level between the additional first and further spaced doped regions, the second forward voltage bias level differing from the first forward voltage bias level, for increasing the concentration of free carriers in the additional gap region to a second concentration level, thereby to provide the additional gap regions with a frequency passband characteristic having a second lower cut off frequency, differing from the first lower cut off frequency, determined by the second forward voltage bias level, for enabling the modulator to band pass filter infra red radiation impinging on the gap region and the additional gap region, the band pass spectrum being determined by the first and second lower cut off frequencies.

8. A modulator according to claim 7 wherein the signal means is arranged to provide a plurality of pairs of forward voltage bias levels between, respectively, the first and further doped regions and the additional first and further doped regions, thereby to cause the first and second lower cut off frequencies to scan in frequency for enabling the modulator to band pass frequency scan any infra red radiation impinging on the gap region and the additional gap region.

* * * * *